(12) United States Patent
Xu et al.

(10) Patent No.: US 11,704,829 B2
(45) Date of Patent: Jul. 18, 2023

(54) POSE RECONSTRUCTION BY TRACKING FOR VIDEO ANALYSIS

(71) Applicants: Sony Group Corporation, Tokyo (JP); Sony Corporation of America, New York, NY (US)

(72) Inventors: Wanxin Xu, San Jose, CA (US); Ko-Kai Albert Huang, Cupertino, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 104 days.

(21) Appl. No.: 17/344,734

(22) Filed: Jun. 10, 2021

(65) Prior Publication Data

US 2022/0398768 A1 Dec. 15, 2022

(51) Int. Cl.
*G06T 7/73* (2017.01)
*G06T 7/292* (2017.01)
*G06V 20/40* (2022.01)
*G06V 40/20* (2022.01)

(52) U.S. Cl.
CPC .............. *G06T 7/73* (2017.01); *G06T 7/292* (2017.01); *G06V 20/40* (2022.01); *G06V 40/23* (2022.01); *G06T 2207/10016* (2013.01); *G06T 2207/30196* (2013.01)

(58) Field of Classification Search
None
See application file for complete search history.

(56) References Cited

U.S. PATENT DOCUMENTS

| 8,958,600 B2 | 2/2015 | Othmezouri et al. |
| 10,853,970 B1 | 12/2020 | Akbas et al. |
| 2015/0294492 A1* | 10/2015 | Koch ................... H04N 13/111 345/426 |

OTHER PUBLICATIONS

"VoxelPose: Towards Multi-Camera 3D HumanPose Estimation in Wild Environment" http://www.ecva.net/papers/eccv_2020/papers_ECCV/papers/123460188.pdf.

* cited by examiner

*Primary Examiner* — Delomia L Gilliard
(74) *Attorney, Agent, or Firm* — Trellis IP Law Group, PC

(57) ABSTRACT

Implementations generally perform pose reconstruction by tracking for video analysis. In some implementations, a method includes obtaining a plurality of videos of at least one subject performing at least one action in an environment. The method further includes tracking the at least one subject across at least two cameras. The method further includes reconstructing a 3-dimensional (3D) model of the at least one subject based on the plurality of videos and the tracking of the at least one subject.

20 Claims, 9 Drawing Sheets

400

POSE RECONSTRUCTION BY TRACKING FOR VIDEO ANALYSIS

CROSS REFERENCES TO RELATED APPLICATIONS

This application is related to the following application, U.S. patent application Ser. No. 17/344,734, entitled CLINICAL ACTIVITY RECOGNITION WITH MULTIPLE CAMERAS, filed on Jun. 10, 2021, which is hereby incorporated by reference as if set forth in full in this application for all purposes.

BACKGROUND

Some camera systems are able to capture videos of a person, analyze movements of the person, and generate an image or video dataset of metadata. To identify human actions captured by camera videos of the system, a person needs to manually view the videos. Manual monitoring and event reporting can be unreliable and time-consuming, especially where the positions and angles of the video cameras may vary and might not provide adequate coverage. Multiple cameras may be used in a controlled environment. However, subjects, movements, and background variation may still be substantially limited.

SUMMARY

Embodiments generally relate to pose reconstruction by tracking for video analysis. In some embodiments, a system includes one or more processors, and includes logic encoded in one or more non-transitory computer-readable storage media for execution by the one or more processors. When executed, the logic is operable to cause the one or more processors to perform operations including: obtaining a plurality of videos of at least one subject performing at least one action in an environment; tracking the at least one subject across at least two cameras; and reconstructing a 3-dimensional (3D) model of the at least one subject based on the plurality of videos and the tracking of the at least one subject.

With further regard to the system, in some embodiments, the plurality of videos that are obtained are 2-dimensional (2D) videos. In some embodiments, the environment is an operating room. In some embodiments, the logic when executed is further operable to cause the one or more processors to perform operations including determining one or more key points for the at least one subject. In some embodiments, the logic when executed is further operable to cause the one or more processors to perform operations including determining pose information associated with the at least one subject. In some embodiments, the logic when executed is further operable to cause the one or more processors to perform operations including determining pose information associated with the at least one subject based on triangulation. In some embodiments, the logic when executed is further operable to cause the one or more processors to perform operations including reconstructing the 3D model of the at least one subject based on the plurality of videos, where the plurality of videos are 2-dimensional (2D) videos.

In some embodiments, a non-transitory computer-readable storage medium with program instructions thereon is provided. When executed by one or more processors, the instructions are operable to cause the one or more processors to perform operations including: obtaining a plurality of videos of at least one subject performing at least one action in an environment; tracking the at least one subject across at least two cameras; and reconstructing a 3-dimensional (3D) model of the at least one subject based on the plurality of videos and the tracking of the at least one subject.

With further regard to the computer-readable storage medium, in some embodiments, the plurality of videos that are obtained are 2-dimensional (2D) videos. In some embodiments, the environment is an operating room. In some embodiments, the logic when executed is further operable to cause the one or more processors to perform operations including determining one or more key points for the at least one subject. In some embodiments, the logic when executed is further operable to cause the one or more processors to perform operations including determining pose information associated with the at least one subject. In some embodiments, the logic when executed is further operable to cause the one or more processors to perform operations including determining pose information associated with the at least one subject based on triangulation. In some embodiments, the logic when executed is further operable to cause the one or more processors to perform operations including reconstructing the 3D model of the at least one subject based on the plurality of videos, where the plurality of videos are 2-dimensional (2D) videos.

In some embodiments, a method includes: obtaining a plurality of videos of at least one subject performing at least one action in an environment; tracking the at least one subject across at least two cameras; and reconstructing a 3-dimensional (3D) model of the at least one subject based on the plurality of videos and the tracking of the at least one subject.

With further regard to the method, in some embodiments, the plurality of videos that are obtained are 2-dimensional (2D) videos. In some embodiments, the environment is an operating room. In some embodiments, the logic when executed is further operable to cause the one or more processors to perform operations including determining one or more key points for the at least one subject. In some embodiments, the logic when executed is further operable to cause the one or more processors to perform operations including determining pose information associated with the at least one subject. In some embodiments, the logic when executed is further operable to cause the one or more processors to perform operations including determining pose information associated with the at least one subject based on triangulation. In some embodiments, the logic when executed is further operable to cause the one or more processors to perform operations including reconstructing the 3D model of the at least one subject based on the plurality of videos, where the plurality of videos are 2-dimensional (2D) videos.

A further understanding of the nature and the advantages of particular implementations disclosed herein may be realized by reference of the remaining portions of the specification and the attached drawings.

DETAILED DESCRIPTION

Embodiments described herein enable, facilitate, and manage pose reconstruction by tracking for video analysis. In various embodiments, a system obtains videos of at least one subject performing at least one action in an environment. The system tracks the at least one subject across at least two cameras. The system further reconstructs a 3-dimensional (3D) model of the at least one subject based on the videos and the tracking of the at least one subject.

Figure 1:
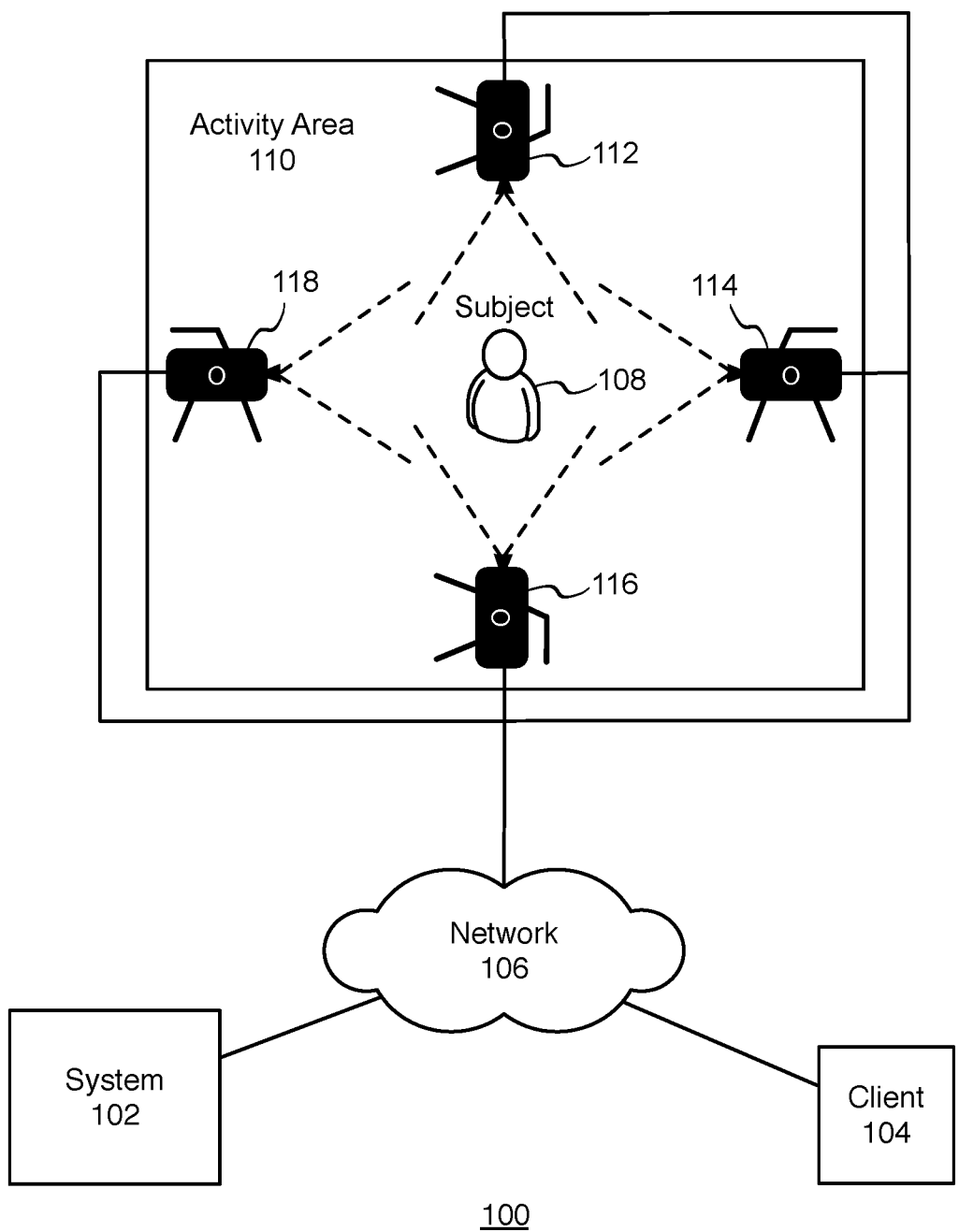
FIG. 1 is a block diagram of an example environment 100 for pose reconstruction by tracking for video analysis, which may be used for implementations described herein.

FIG. 1 is a block diagram of an example environment 100 for recognizing clinical activity using multiple cameras, which may be used for implementations described herein. As described in more detail herein, system 102 is a context-aware system that provides better patient treatment and higher hospital efficiency. In some implementations, environment 100 includes a system 102, which communicates with a client 104 via a network 106. Network 106 may be any suitable communication network such as a Wi-Fi network, Bluetooth network, the Internet, etc.

In various embodiments, environment 100 may be any environment, where activity involving one or more people and/or one or more objects is recognized, monitored, and tracked. In various embodiments, environment 100 may be any clinical setting. For example, in some embodiments, environment 100 may be an operating room. In other embodiments, environment 100 may be an intensive care unit (ICU), a patient room, an emergency room, etc.

Activity area 110 may be the operating area of an operating room. In some embodiments, activity area 110 may be the entire operating room. In various embodiments, system 102, client 104, and network 106 may be local to the environment, remote (e.g., in the cloud), or combination thereof.

In various embodiments, the videos are captured by at least two video cameras. For example, as shown, system 102 monitors the activity of an object 108 in an activity area 110 using physical video cameras 112, 114, 116, and 118, which capture video of object 108 at different angles.

As described in more detail herein, in various embodiments, object 108 may represent one or more people. For example, in various scenarios, object 108 may represent one or more of clinicians such as a doctors and nurse, one or more assistants, a patient, etc. In various embodiments, object 108 may also represent one or more inanimate objects. For example, in various scenarios, object 108 may represent one or more hospital beds, surgery equipment, surgery tools, etc. Also, object 108 may represent multiple persons or multiple inanimate objects or a combination thereof. The particular type of object may vary and will depend on the particular implementation. In various embodiments, object 108 may also be referred to as a subject 108, a person 108, a target user 108, or any inanimate object 108.

In various embodiments, the system utilizes vision-based approaches, which are efficient in that there is no need for subjects to have any wearable equipment. Vision-based approaches are also highly scalable to different settings of the system. In various embodiments, the system automatically and accurately recognizes activity in a clinical environment (e.g., operating room, emergency room, etc.), which enables understanding of surgical or clinical workflow that is critical for optimizing clinical activities. The system performs real-time monitoring of staff and patient activities in an environment in order to enhance patient outcomes and care with reduced staff costs.

In various embodiments, physical video cameras 112, 114, 116, and 118 are positioned at various locations in order to capture multiple videos and/or still images from different points of view of the same object, including at different angles and/or at different distances. The terms cameras and video cameras may be used interchangeably. These different points of view make the appearance of different objects more distinguishable.

For ease of illustration, FIG. 1 shows one block for each of system 102, client 104, network 106, and activity area 110. Blocks 102, 104, 106, and 110 may represent multiple systems, client devices, networks, and activity areas. Also, there may be any number of people/subjects on a given activity area. For example, in some embodiments, subject 108 may represent one or more different subjects. In other implementations, environment 100 may not have all of the components shown and/or may have other elements including other types of elements instead of, or in addition to, those shown herein.

While system 102 performs embodiments described herein, in other embodiments, any suitable component or combination of components associated with system 102 or any suitable processor or processors associated with system 102 may facilitate performing the embodiments described herein.

Figure 2:
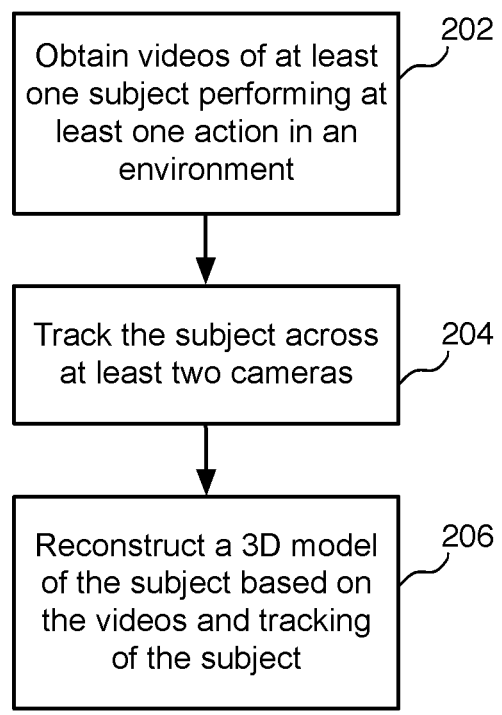
FIG. 2 is an example flow diagram for pose reconstruction by tracking for video analysis, according to some embodiments.

FIG. 2 is an example flow diagram for pose reconstruction by tracking for video analysis, according to some embodiments. Referring to both FIGS. 1 and 2, a method is initiated at block 202, where a system such as system 102 obtains multiple videos of at least one subject performing at least one action in an environment. In various embodiments, the cameras records the videos, and may store the videos in any suitable storage location. In various embodiments, video sequences are captured from multiple cameras, where the cameras may be configured with predetermined (including pre-calibrated) camera parameters. Such camera parameters may include one or more intrinsic matrices, one or more extrinsic matrices, etc.

At block 204, system 102 tracks the at least one subject across at least two cameras. In various embodiments, the videos that are obtained are 2-dimensional (2D) videos. In various embodiments, the system avoids cross-view association ambiguity by processing 2D video information from multiple cameras. Noisy and incomplete 2D poses resulting from occlusions may complicate the associations of a given pose from different cameras, which may further influence the reconstruction of the pose in 3D space. By utilizing multiple cameras, the system may track each individual object from camera to camera without losing sight of the object.

In various embodiments, the system determines one or more key points for each object or subject that the system tracks via the video cameras. The system also determines pose information associated with each object. The system also determines pose information based on the respective key points associated with each object. In various embodiments, the system determines pose information associated with the at least one subject based on triangulation. Further embodiments directed to key points, pose information, and triangulation are described in more detail herein.

At block 206, system 102 reconstructs a 3-dimensional (3D) model of the at least one subject based on the videos and the tracking of the at least one subject. In various embodiments, the system reconstructs the 3D model of the object or subject based on the videos, where the videos are 2D videos. The reconstruction of a 3D model may be applied to various areas. For example, such areas may be applied to behavior understanding in medical or sports field, surveillance and security, retail or manufacture industry, etc. The particular application may vary and will depend on the particular implementation.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 3:
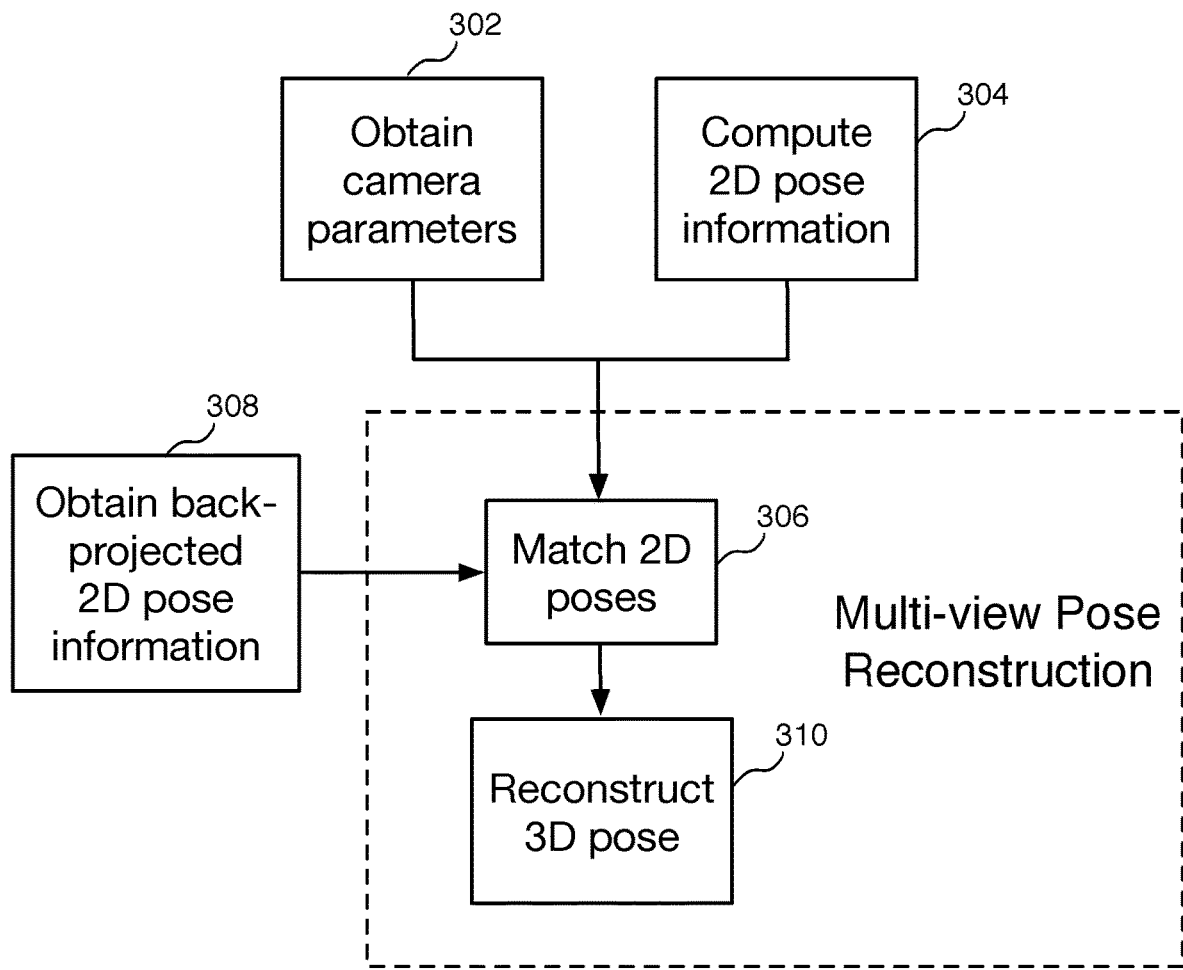
FIG. 3 is an example flow diagram for reconstructing a multi-view pose, according to some embodiments.

FIG. 3 is an example flow diagram for reconstructing a multi-view pose, according to some embodiments. The following details describe pose reconstruction and a tracking framework, according to some embodiments. Referring to both FIGS. 1 and 3, a method is initiated at block 302, where a system such as system 102 obtains camera parameters. In various embodiments, the camera parameters may include an intrinsic matrix and an extrinsic matrix for each camera in the system, depending on the setting of the environment.

At block 304, system 102 computes two-dimensional (2D) pose information. In various embodiments, to compute the 2D pose information, the system may utilize a general key point estimator and use either a top-down or bottom-up approach.

At block 306, system 102 matches 2D poses. In various embodiments, the pose matching maintains and tracks the identity of each target object captured on video consistent across multiple cameras. In various embodiments, the system may apply one or more metrics for matching. Example metrics may include epipolar constraints, a Euclidean distance and algorithm for data association, a Hungarian algorithm, etc.

In an example scenario, the system may associate the 2D poses of the same person across different camera views by using geometric and cycle-consistent constraints, etc. As such, if a person leaves the field of view of one camera, the same person will be captured in the field of view of another camera in the same environment. In various embodiments, the system may track the movement and pose of a person based on detection and knowledge of portions of the person such as joints of limbs, height, joint and limb positions, trajectory of the person, etc.

In contrast to previous methods that associate the poses across cameras frame-by-frame, embodiments described herein reduce computations by using the pose tracking information in 3D space.

At block 308, system 102 obtains back-projected 2D pose information. In various embodiments, the system may obtain back-projected 2D pose information by projecting 3D pose information from block 310 to an image plane. In various embodiments, tracking information from 3D space provides guidance to the current frame for pose matching at block 306.

At block 310, system 102 reconstructs a 3D pose. In various embodiments, the system determines the 3D location of a pose based on multiple 2D corresponding poses and triangulation. Embodiments directed to triangulation are described in more detail herein in connection with FIG. 7, for example.

Figure 4:
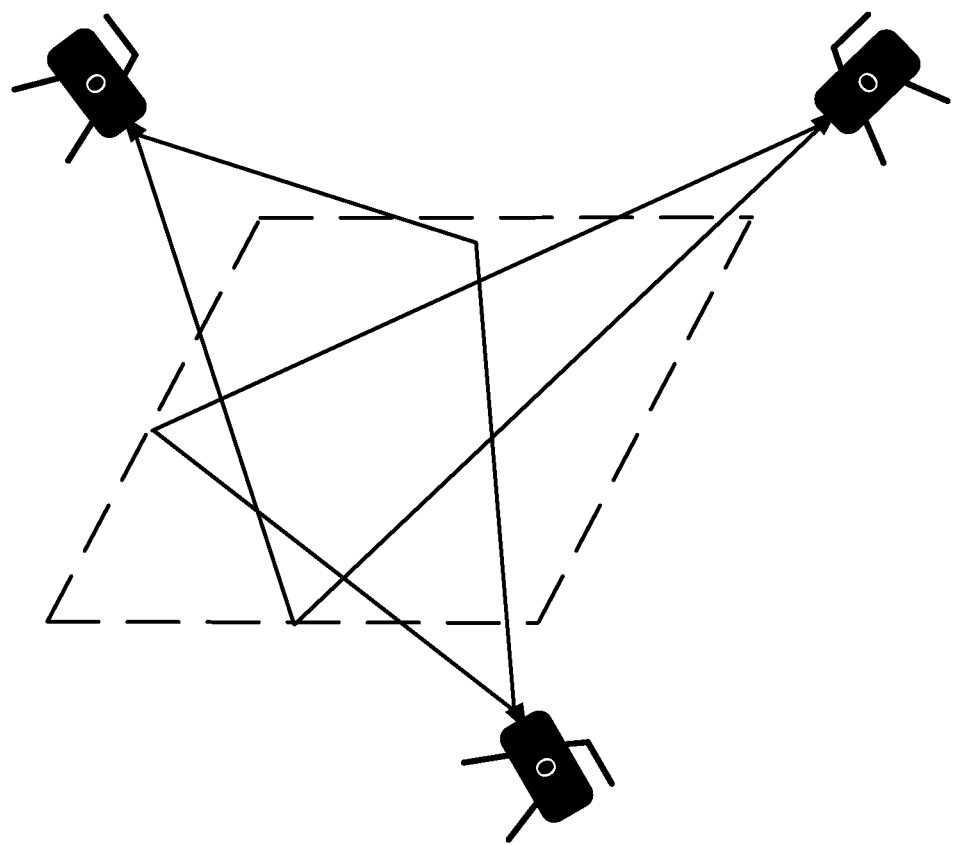
FIG. 4 is a block diagram of an example environment for recognizing clinical activity using multiple cameras and an overlap region, which may be used for implementations described herein.

FIG. 4 is a block diagram of an example environment 400 for recognizing clinical activity using multiple cameras and an overlap region, which may be used for implementations described herein. Environment 400 includes cameras 402, 404, and 406. In various embodiments, cameras 402-406 may be positioned at different locations.

In various embodiments, cameras 402-406 may be positioned at different locations such that their fields of view overlap. As shown, the fields of view of cameras 402, 404, and 406 overlap at overlap region 408. When a given object or objects (e.g., staff, patient, etc.) is positioned in overlap region 408, each of cameras 402, 404, and 406 is able to capture footage of the given object or objects.

In various embodiments, cameras 402-406 are set up pre-calibrated to avoid occlusion and to enable 3D reconstruction of objects in the environment. In various embodiments, the objects used for calibration are visible by all the cameras simultaneously. While 3 cameras are shown, there may be any number of cameras in environment 400. The particular number of cameras may depend on the particular environment. In various embodiments, the system uses cameras 402-406 to monitor objects such as tile on floor in order to calibrate patterns in the environment. Alternative camera calibration methods may be used including a commonly used checkerboard pattern or using red-green-blue-depth (RGB-D) cameras.

Figure 5:
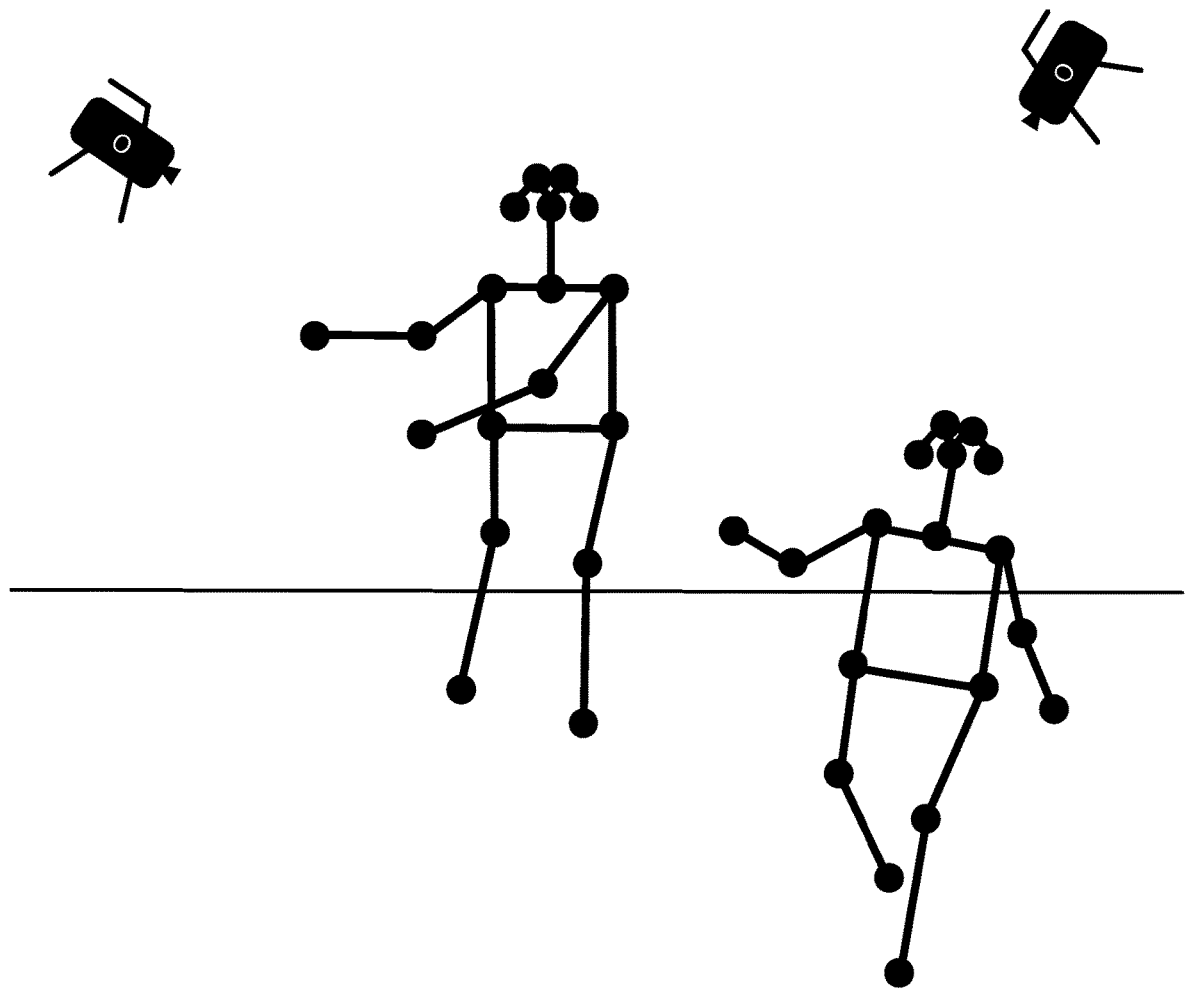
FIG. 5 is a block diagram of an example environment for recognizing clinical activity, which may be used for implementations described herein.

FIG. 5 is a block diagram of an example environment 500 for recognizing clinical activity, which may be used for implementations described herein. Shown are cameras 502 and 504, which capture video footage of objects or subjects 506 and 508. Objects 506 and 508 may be, for example, staff members in an operating room, or a staff member and a patient in the operating room, etc.

In various embodiments, the system performs data fusion and clinical action recognition, including skeleton-based activity recognition. As indicated above, in various embodiments, data fusion is a process that associates or fuses the pose of a person from one camera to the pose of the same person from other cameras. After data fusion, the system reconstructs the 3D pose of all objects (e.g., staff, patient, etc.) in a virtual 3D space, given multiple 2D corresponding poses.

The system recognizes the actions of each staff member and the patient based on their skeletal poses. Such actions may include standing, walking, crouching, sitting, etc. The system may utilize an action classifier to recognize such actions. The processes of the system is robust to visual noise such as background objects, irrelevant objects (e.g., clothing texture, etc.) compared with RGB images or depth maps. Alternative methods may include recognizing actions directly from images or depth maps. In some embodiments, the system may achieve additional gains by tracking poses in the reconstructed 3D space, and extracting skeleton features from both spatial and temporal space.

Figure 6:
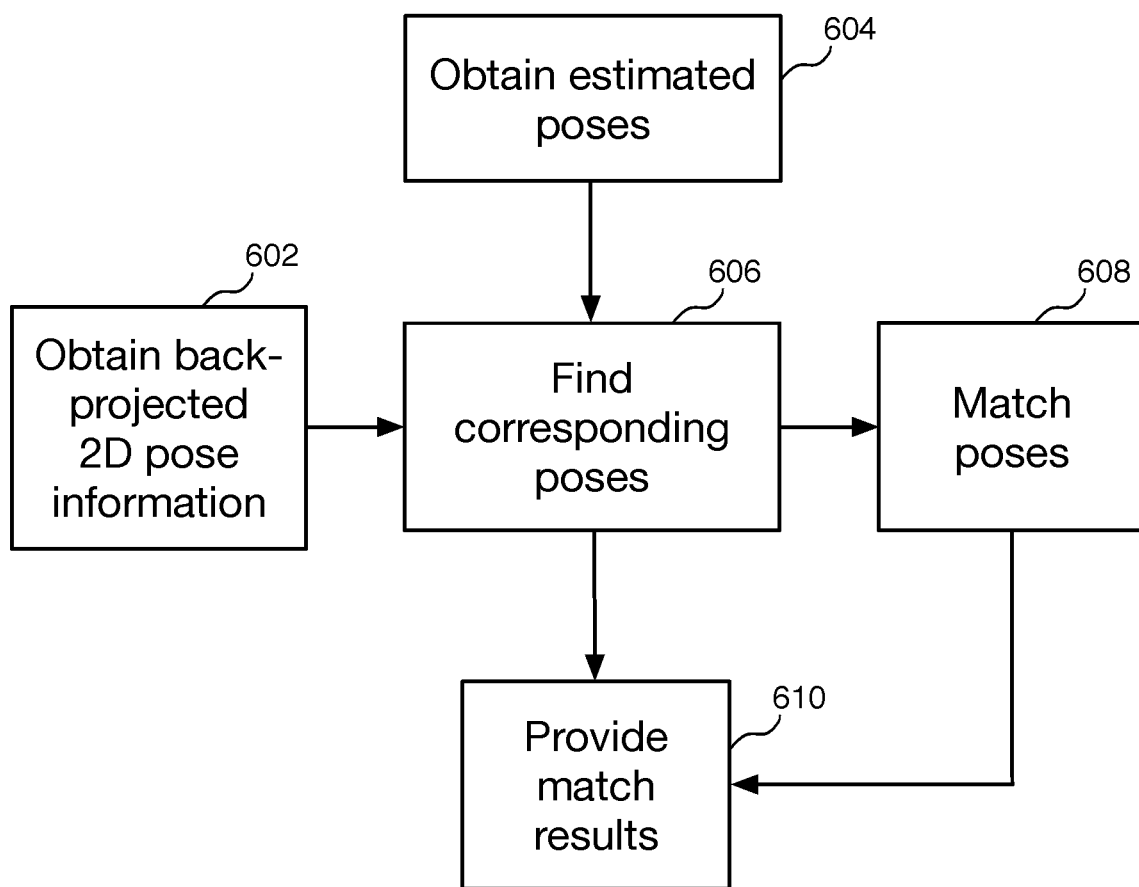
FIG. 6 is an example flow diagram for determining a multi-view pose, according to some embodiments.

FIG. 6 is an example flow diagram for determining a multi-view pose, according to some embodiments. Referring to both FIGS. 1 and 6, a method is initiated at block 602, where a system such as system 102 obtains back-projected 2D pose information.

At block 604, system 102 obtains estimated poses. The system collects estimated poses for each object detected in the cameras.

At block 606, system 102 finds corresponding poses. Such corresponding poses may include different poses of the same object (e.g., person) captured by different cameras.

At block 608, system 102 matches poses. For example, the system matches the poses from the same object (e.g., person) from the different cameras. In some embodiments, the system performs the pose matching step if the pose fails to be matched to any existing tracklets. A tracklet may be defined as a fragment of a track followed by a moving object, as constructed by an image recognition system.

In various embodiments, the system may apply one or more metrics for matching. Example metrics may include epipolar constraints, a Euclidean distance and algorithm for data association, a Hungarian algorithm, etc.

At block 610, system 102 provides match results. The match results indicate all of the poses of each particular object (e.g., person).

Figure 7:
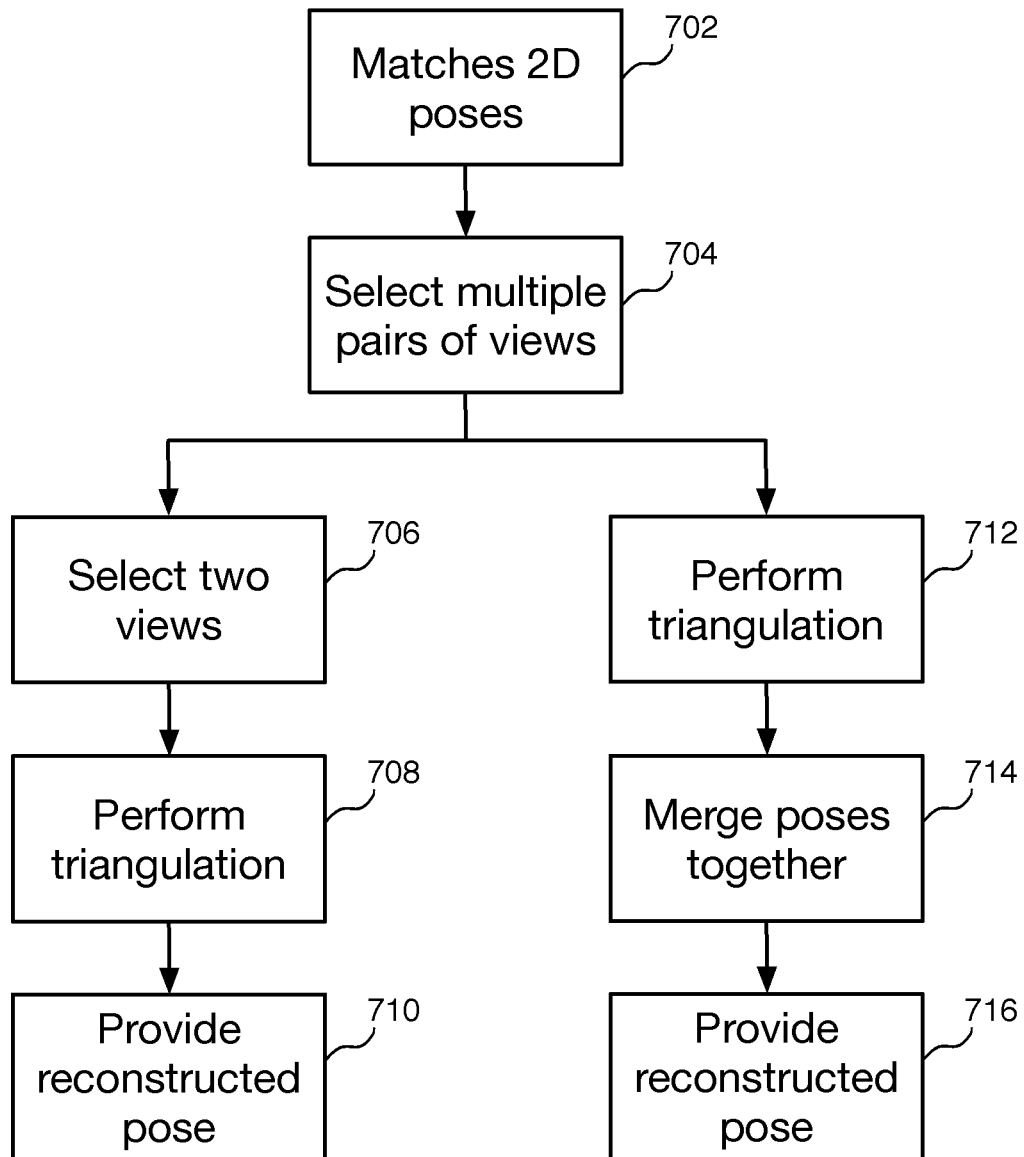
FIG. 7 is an example flow diagram for providing a reconstructed pose, according to some embodiments.

FIG. 7 is an example flow diagram for providing a reconstructed pose, according to some embodiments. Referring to both FIGS. 1 and 7, a method is initiated at block 702, where a system such as system 102 matches 2D poses.

At block 704, system 102 selects multiple pairs of views from the 2D poses. In various embodiments, the system obtains each pair is from a different camera. In various embodiments, the selection of the multiple pairs of views may be based on two conditions. In some embodiments, the first condition may be to select pairs of views based on a re-projection error being below a predetermined threshold. In some embodiments, the second condition may be to select pairs of views based on a confidence score being greater than a predetermined threshold. For example, a higher confidence score may be associated with less occlusion, and a lower confidence score may be associated with more occlusion, The selection may be achieved by minimizing the re-projection error and by maximizing the confidence score for accurate 3D reconstruction.

As described below, the method follows two series of steps to provide the reconstructed pose. The first series is associated with blocks 706, 708, and 710. The system performs these steps if the set of pairs of views are not empty. The second series is associated with blocks 712, 714, and 716. The system performs these steps if no pairs of views are chosen.

At block 706, system 102 selects two views. In various embodiments, the system selects two views with maximum-rank confidence score and a minimum-rank reprojection error. The system may use the two views to perform triangulation for 3D pose reconstruction, as described below in connection with block 708.

At block 708, system 102 performs triangulation. In various embodiments, the system may utilize adaptive triangulation. Triangulation may be used to obtain 3D pose information based on given 2D matched poses in the multi-view framework. In some embodiments, the system may adaptively select a subset of camera views for 3D pose reconstruction instead of performing reconstruction over all cameras. For example, to minimize computation, the system may determine the cameras that capture a given target object. Other cameras that do not capture the given object are not needed and thus not used to collect information for that particular object. Using only the cameras that capture the object ensures that the system performs sufficient yet not excessive computations.

At block 710, system 102 provides a reconstructed pose. In various embodiments, the system determines the 3D location of each pose of the same object (e.g., clinician, patient, etc.) based on multiple 2D corresponding poses and triangulation. The system determines the poses from the video feed of the multiple cameras in order to reconstruct a 3D pose of each object.

As indicated above, the second series is associated with blocks 712, 714, and 716. The system performs these steps if no pairs of views are chosen.

At block 712, system 102 performs triangulation. In various embodiments, system 102 performs triangulation similarly to step 708 described above.

At block 714, system 102 merges poses together. For example, in various embodiments, the system aggregates the poses of each object (e.g., clinician, patient, etc.) from different viewpoints of the different cameras capturing each object.

At block 716, system 102 provides a reconstructed pose. In various embodiments, system 102 performs triangulation similarly to step 710 described above.

Embodiments described herein provide various benefits. For example, embodiments efficiently estimate the 3D pose of all persons in an environment with a set of calibrated cameras. Embodiments may be built upon any real-time multi-person 2D pose estimation system, and such embodiments are robust to occlusions, which may occur frequently in practical applications.

Embodiments described herein are simple yet effective in multi-camera multi-target pose reconstruction in 3D. Embodiments described herein also provide a cost-effective solution for pose matching, which serves as an important step for further 3D pose reconstruction.

Figure 8:
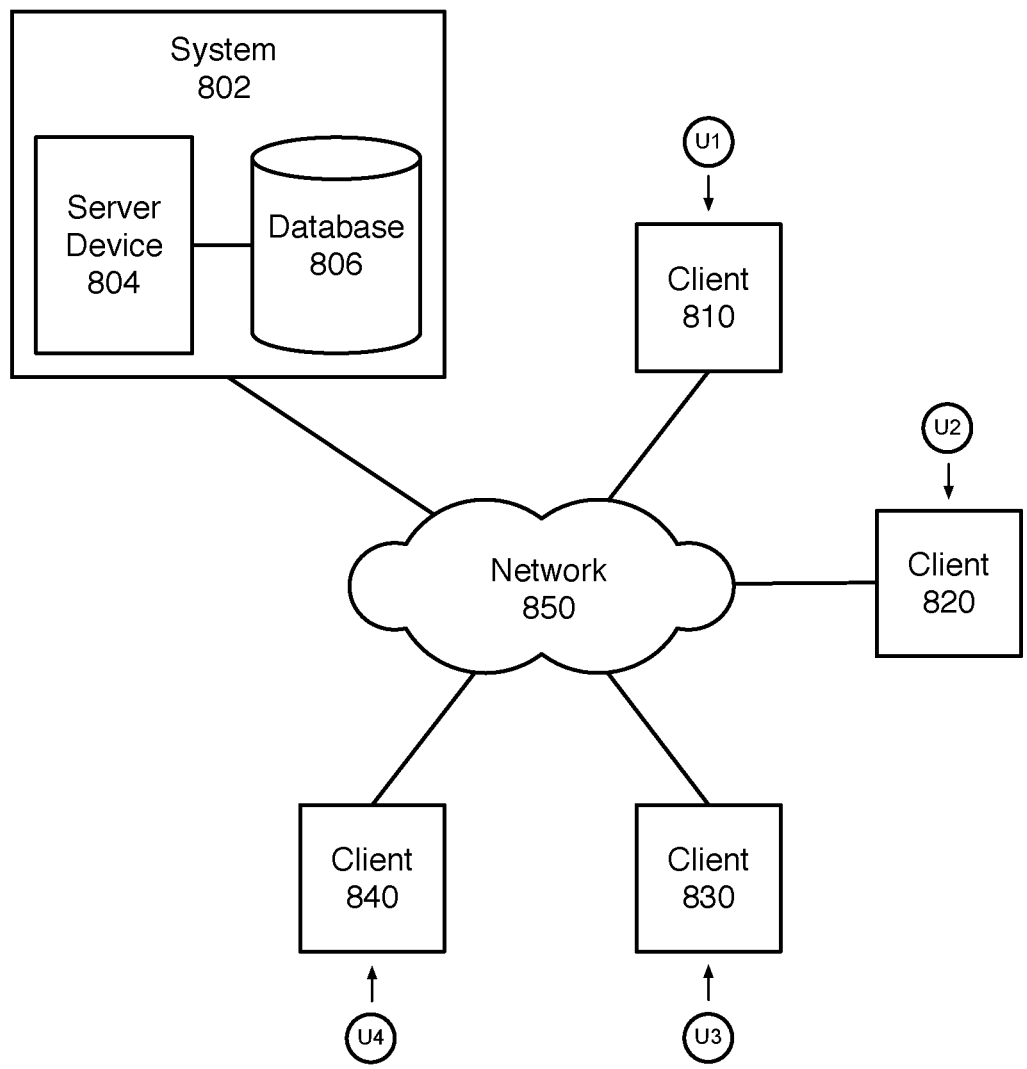
FIG. 8 is a block diagram of an example network environment, which may be used for some implementations described herein.

FIG. 8 is a block diagram of an example network environment 800, which may be used for some implementations described herein. In some implementations, network environment 800 includes a system 802, which includes a server device 804 and a database 806. For example, system 802 may be used to implement system 102 of FIG. 1, as well as to perform embodiments described herein. Network environment 800 also includes client devices 810, 820, 830, and 840, which may communicate with system 802 and/or may communicate with each other directly or via system 802. Network environment 800 also includes a network 850 through which system 802 and client devices 810, 820, 830, and 840 communicate. Network 850 may be any suitable communication network such as a Wi-Fi network, Bluetooth network, the Internet, etc.

For ease of illustration, FIG. 8 shows one block for each of system 802, server device 804, and network database 806, and shows four blocks for client devices 810, 820, 830, and 840. Blocks 802, 804, and 806 may represent multiple systems, server devices, and network databases. Also, there may be any number of client devices. In other implementations, environment 800 may not have all of the components shown and/or may have other elements including other types of elements instead of, or in addition to, those shown herein.

While server device 804 of system 802 performs embodiments described herein, in other embodiments, any suitable component or combination of components associated with system 802 or any suitable processor or processors associated with system 802 may facilitate performing the embodiments described herein.

In the various embodiments described herein, a processor of system 802 and/or a processor of any client device 810, 820, 830, and 840 cause the elements described herein (e.g., information, etc.) to be displayed in a user interface on one or more display screens.

Figure 9:
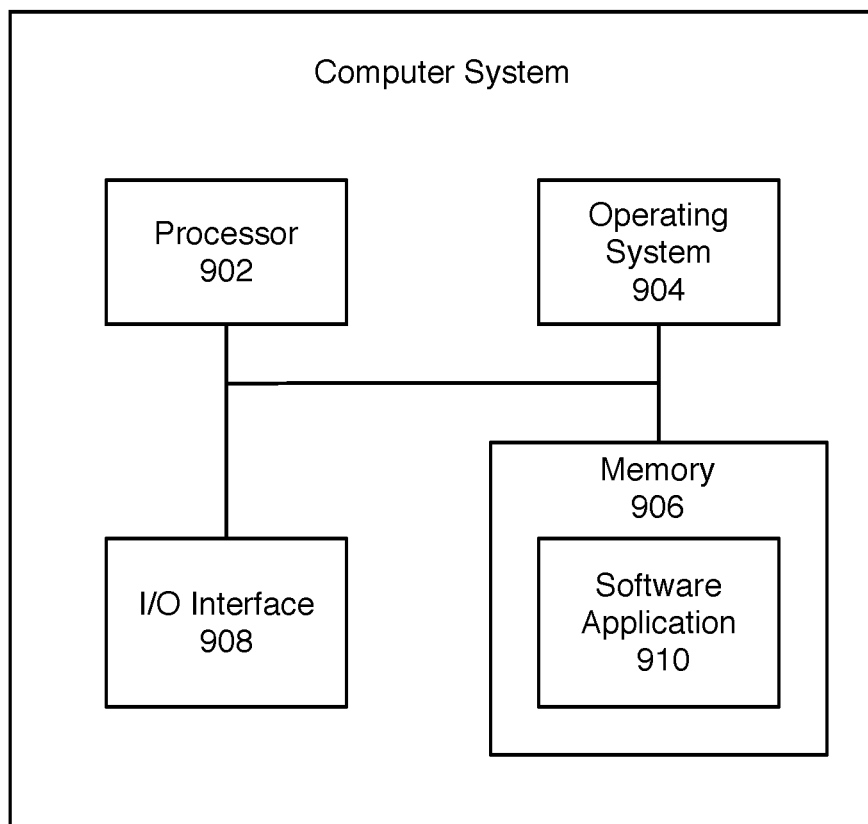
FIG. 9 is a block diagram of an example computer system, which may be used for some implementations described herein.

FIG. 9 is a block diagram of an example computer system 900, which may be used for some implementations described herein. For example, computer system 900 may be used to implement server device 804 of FIG. 8 and/or system 102 of FIG. 1, as well as to perform embodiments described herein. In some implementations, computer system 900 may include a processor 902, an operating system 904, a memory 906, and an input/output (I/O) interface 908. In various implementations, processor 902 may be used to implement various functions and features described herein, as well as to perform the method implementations described herein. While processor 902 is described as performing implementations described herein, any suitable component or combination of components of computer system 900 or any suitable processor or processors associated with computer system 900 or any suitable system may perform the steps described. Implementations described herein may be carried out on a user device, on a server, or a combination of both.

Computer system 900 also includes a software application 910, which may be stored on memory 906 or on any other suitable storage location or computer-readable medium. Software application 910 provides instructions that enable processor 902 to perform the implementations described herein and other functions. Software application may also include an engine such as a network engine for performing various functions associated with one or more networks and network communications. The components of computer system 900 may be implemented by one or more processors or any combination of hardware devices, as well as any combination of hardware, software, firmware, etc.

For ease of illustration, FIG. 9 shows one block for each of processor 902, operating system 904, memory 906, I/O interface 908, and software application 910. These blocks 902, 904, 906, 908, and 910 may represent multiple processors, operating systems, memories, I/O interfaces, and software applications. In various implementations, computer system 900 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A system comprising:
one or more processors; and
logic encoded in one or more non-transitory computer-readable storage media for execution by the one or more processors and when executed operable to cause the one or more processors to perform operations comprising:
obtaining a plurality of videos of at least one subject performing at least one action in an environment;
tracking the at least one subject across at least two cameras;
determining estimated poses for one or more objects detected by the at least two cameras;
finding corresponding poses comprising different estimated poses of a same object of the one or more objects captured by the at least two cameras;
matching the corresponding poses of the same object; and
reconstructing a 3-dimensional (3D) model of the at least one subject based on the plurality of videos, the tracking of the at least one subject, and the matching of the corresponding poses.

2. The system of claim 1, wherein the plurality of videos that are obtained are 2-dimensional (2D) videos.

3. The system of claim 1, wherein the environment is an operating room.

4. The system of claim 1, wherein the logic when executed is further operable to cause the one or more processors to perform operations comprising determining one or more key points for the at least one subject.

5. The system of claim 1, wherein the logic when executed is further operable to cause the one or more processors to perform operations comprising determining pose information associated with the at least one subject.

6. The system of claim 1, wherein the logic when executed is further operable to cause the one or more processors to perform operations comprising determining pose information associated with the at least one subject based on triangulation.

7. The system of claim 1, wherein the logic when executed is further operable to cause the one or more processors to perform operations comprising reconstructing the 3D model of the at least one subject based on the plurality of videos, wherein the plurality of videos are 2-dimensional (2D) videos.

8. A non-transitory computer-readable storage medium with program instructions stored thereon, the program instructions when executed by one or more processors are operable to cause the one or more processors to perform operations comprising:
obtaining a plurality of videos of at least one subject performing at least one action in an environment;
tracking the at least one subject across at least two cameras;
determining estimated poses for one or more objects detected by the at least two cameras;
finding corresponding poses comprising different estimated poses of a same object of the one or more objects captured by the at least two cameras;
matching the corresponding poses of the same object; and
reconstructing a 3-dimensional (3D) model of the at least one subject based on the plurality of videos, the tracking of the at least one subject, and the matching of the corresponding poses.

9. The computer-readable storage medium of claim 8, wherein the plurality of videos that are obtained are 2-dimensional (2D) videos.

10. The computer-readable storage medium of claim 8, wherein the environment is an operating room.

11. The computer-readable storage medium of claim 8, wherein the instructions when executed are further operable to cause the one or more processors to perform operations comprising determining one or more key points for the at least one subject.

12. The computer-readable storage medium of claim 8, wherein the instructions when executed are further operable to cause the one or more processors to perform operations comprising determining pose information associated with the at least one subject.

13. The computer-readable storage medium of claim 8, wherein the instructions when executed are further operable to cause the one or more processors to perform operations comprising determining pose information associated with the at least one subject based on triangulation.

14. The computer-readable storage medium of claim 8, wherein the instructions when executed are further operable to cause the one or more processors to perform operations comprising reconstructing the 3D model of the at least one subject based on the plurality of videos, wherein the plurality of videos are 2-dimensional (2D) videos.

15. A computer-implemented method comprising:
obtaining a plurality of videos of at least one subject performing at least one action in an environment;
tracking the at least one subject across at least two cameras;
determining estimated poses for one or more objects detected by the at least two cameras;
finding corresponding poses comprising different estimated poses of a same object of the one or more objects captured by the at least two cameras;
matching the corresponding poses of the same object; and
reconstructing a 3-dimensional (3D) model of the at least one subject based on the plurality of videos, the tracking of the at least one subject, and the matching of the corresponding poses.

16. The method of claim 15, wherein the plurality of videos that are obtained are 2-dimensional (2D) videos.

17. The method of claim 15, wherein the environment is an operating room.

18. The method of claim 15, further comprising determining one or more key points for the at least one subject.

19. The method of claim 15, further comprising determining pose information associated with the at least one subject.

20. The method of claim 15, further comprising determining pose information associated with the at least one subject based on triangulation.

* * * * *